United States Patent [19]

Perelman et al.

[11] Patent Number: 5,287,498

[45] Date of Patent: Feb. 15, 1994

[54] MESSAGE TRANSMITTING SYSTEM WHEREIN RECIPIENT SITE IS DETERMINED USING INFORMATION CONCERNING THE RELATIONSHIP BETWEEN THE SENDER AND RECIPIENT SITES

[75] Inventors: Roberto Perelman, Sunnyvale; Chris Yuan, Fremont; Bipin Patel; Jack J. Ahn, both of San Jose; Mark E. Kaminsky, Sunnyvale, all of Calif.

[73] Assignee: Rolm Company, Santa Clara, Calif.

[21] Appl. No.: 679,376

[22] Filed: Apr. 2, 1991

[51] Int. Cl.$^5$ .............................................. G06F 13/14
[52] U.S. Cl. ..................... 395/600; 364/260; 364/282.4; 364/284; 364/284.3; 364/DIG. 1; 395/200
[58] Field of Search ............... 395/600, 800, 200, 575, 395/800, 650; 364/513; 379/245

[56] References Cited

U.S. PATENT DOCUMENTS

| | | | |
|---|---|---|---|
| 4,573,140 | 2/1986 | Szeto | 364/900 |
| 4,580,012 | 4/1986 | Matthews et al. | 379/245 |
| 5,008,835 | 4/1991 | Jachmann et al. | 364/513 |
| 5,089,954 | 2/1992 | Rago | 395/600 |

Primary Examiner—Thomas C. Lee
Assistant Examiner—Jennifer M. Orzech
Attorney, Agent, or Firm—Michael B. Einschlag

[57] ABSTRACT

Method and apparatus for providing a universal addressing plan for a network of voice store-and-forward messaging system sites wherein a telephone numbering plan for a telephone network can be mirrored among the sites in the network, notwithstanding whether the sites utilize the public switched network or on a private network. An embodiment of the invention is apparatus for use in a network of sites in transmitting a message from a message sender at a message sender site to a message recipient at a message recipient site which is collocated or remote from the message sender site, which apparatus includes: (a) a site database to store whether a site is collocated or remote with respect to other sites in the network; (b) an address database to store groups of network addresses associated with the site; (c) a user database to store a network address and a local mailbox number for users; (d) an apparatus for determining the message sender's identification and for receiving a network address for the message recipient; and (e) a translation processor for accessing one or more databases using: (i) the message sender identification to retrieve a message sender site identifier and (ii) the message site identifier and the message recipient network address to retrieve a message recipient site identifier.

8 Claims, 14 Drawing Sheets

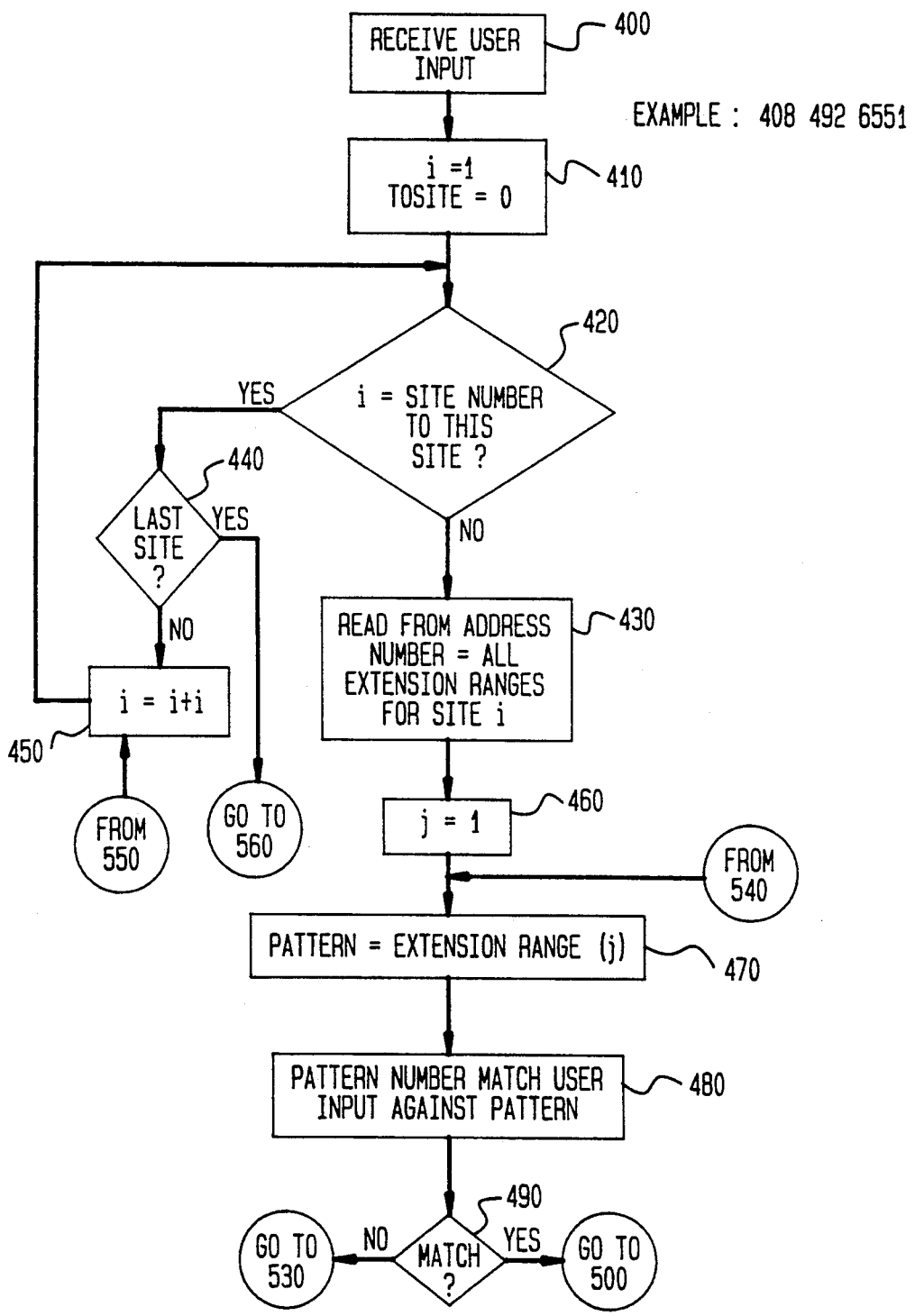
FIG. 3A1

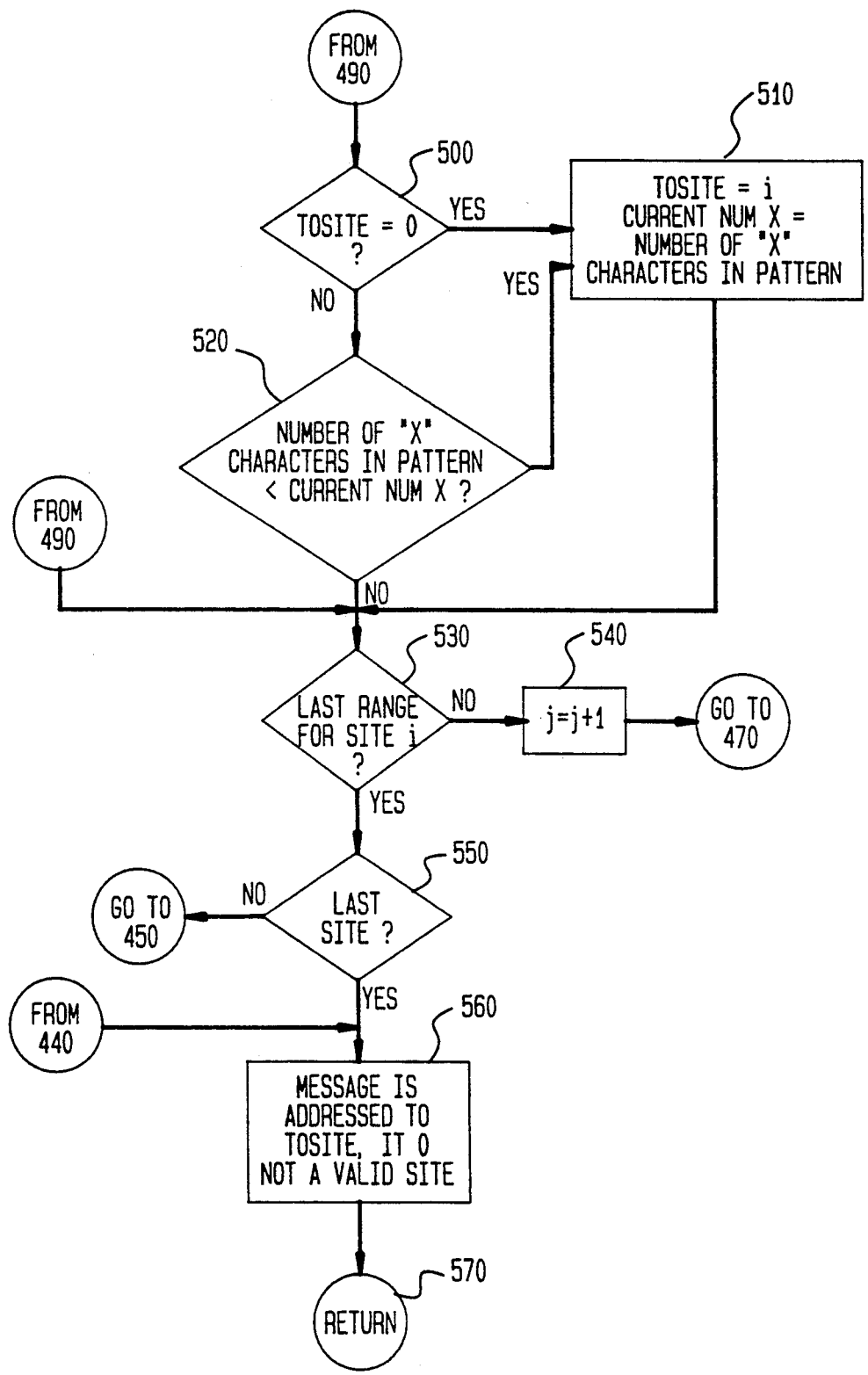
FIG. 3A2

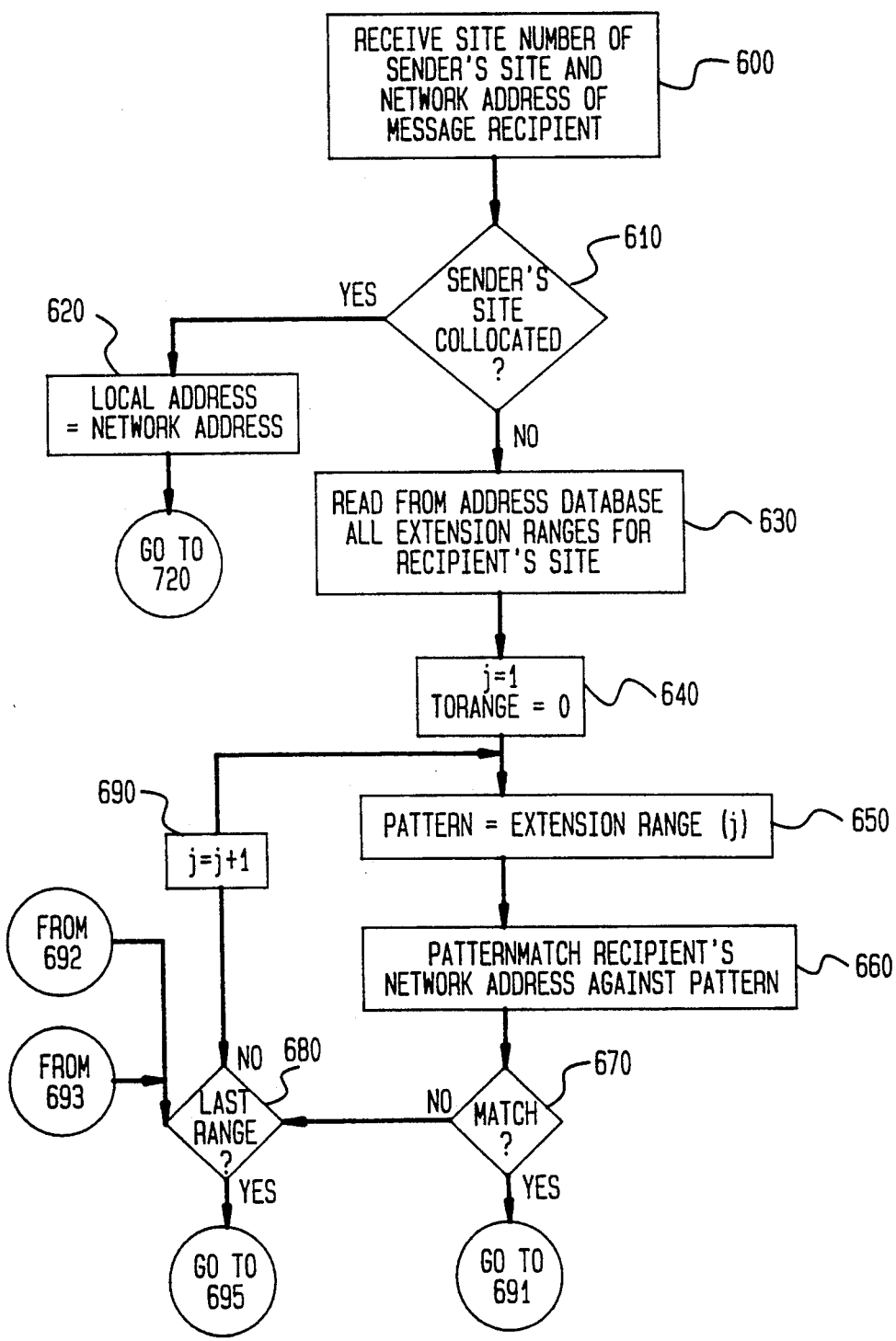
FIG. 3B1

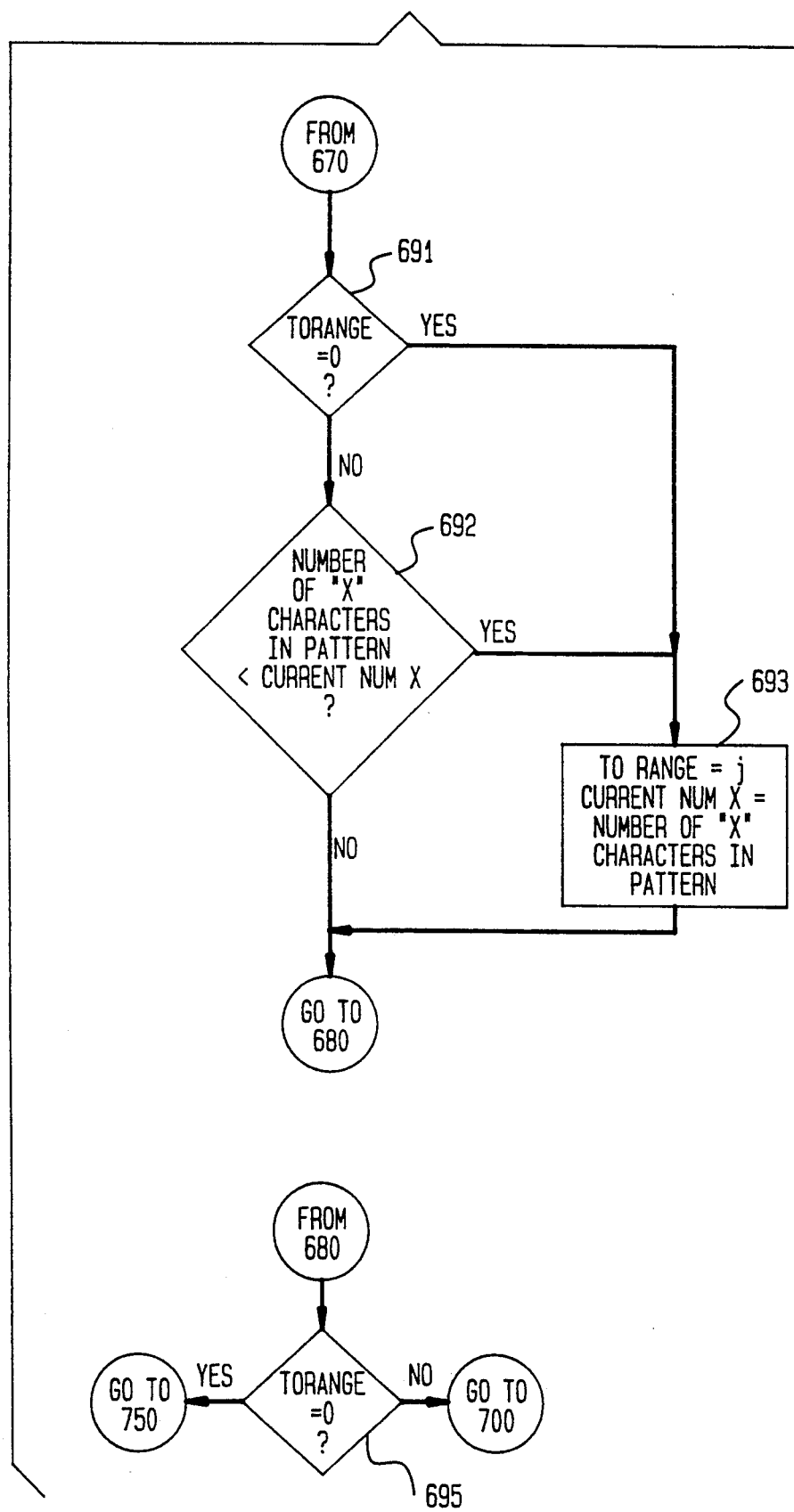
FIG. 3B2

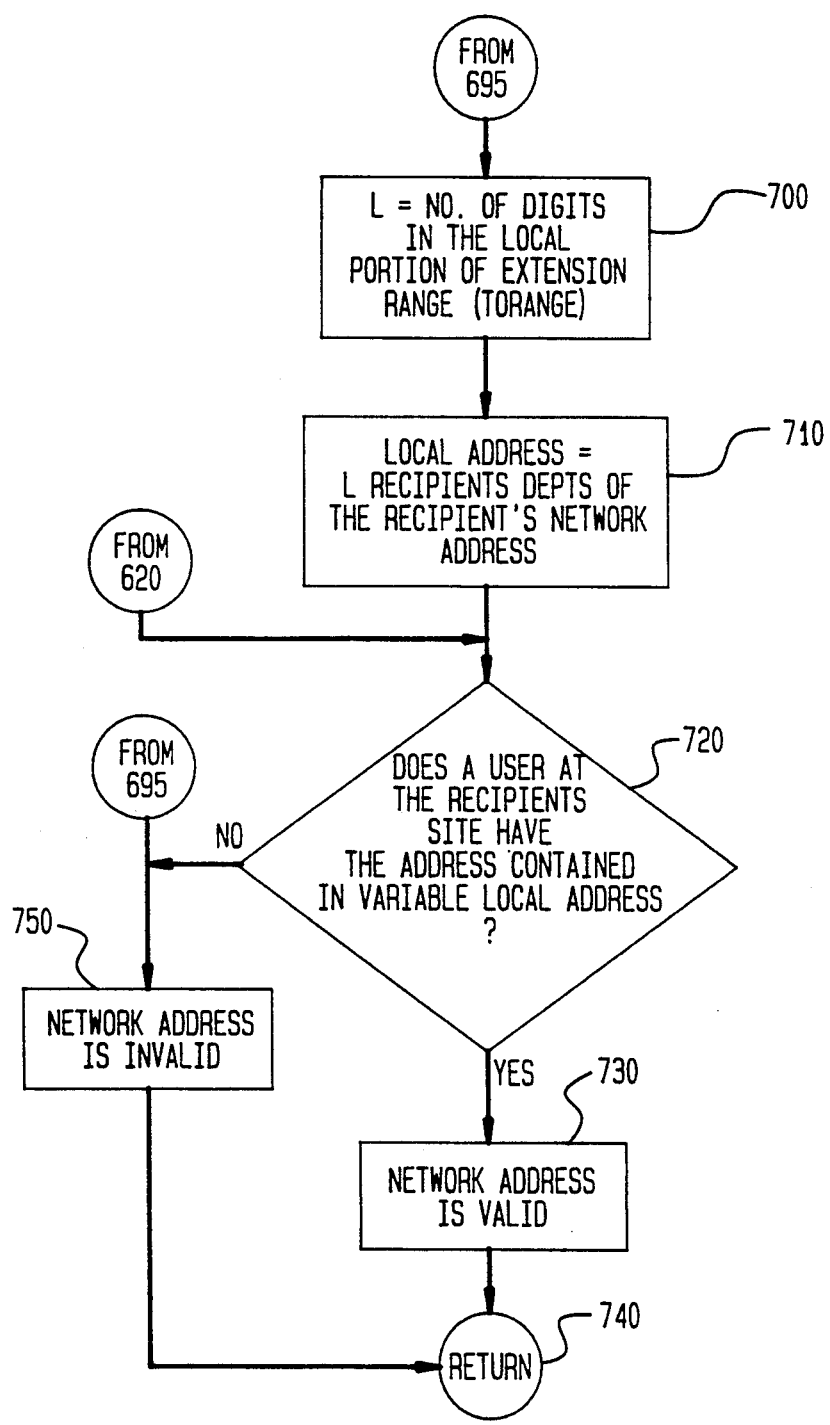
FIG. 3B3

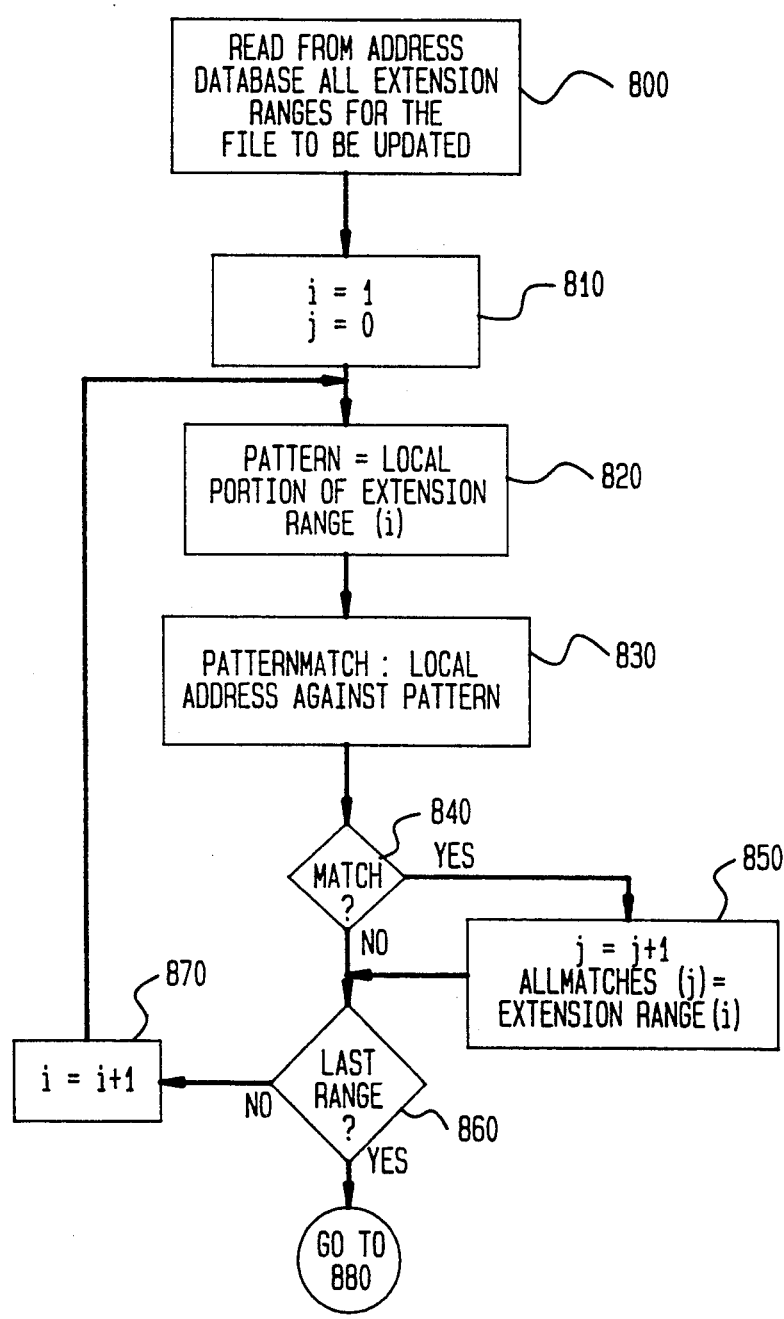
FIG. 3C1

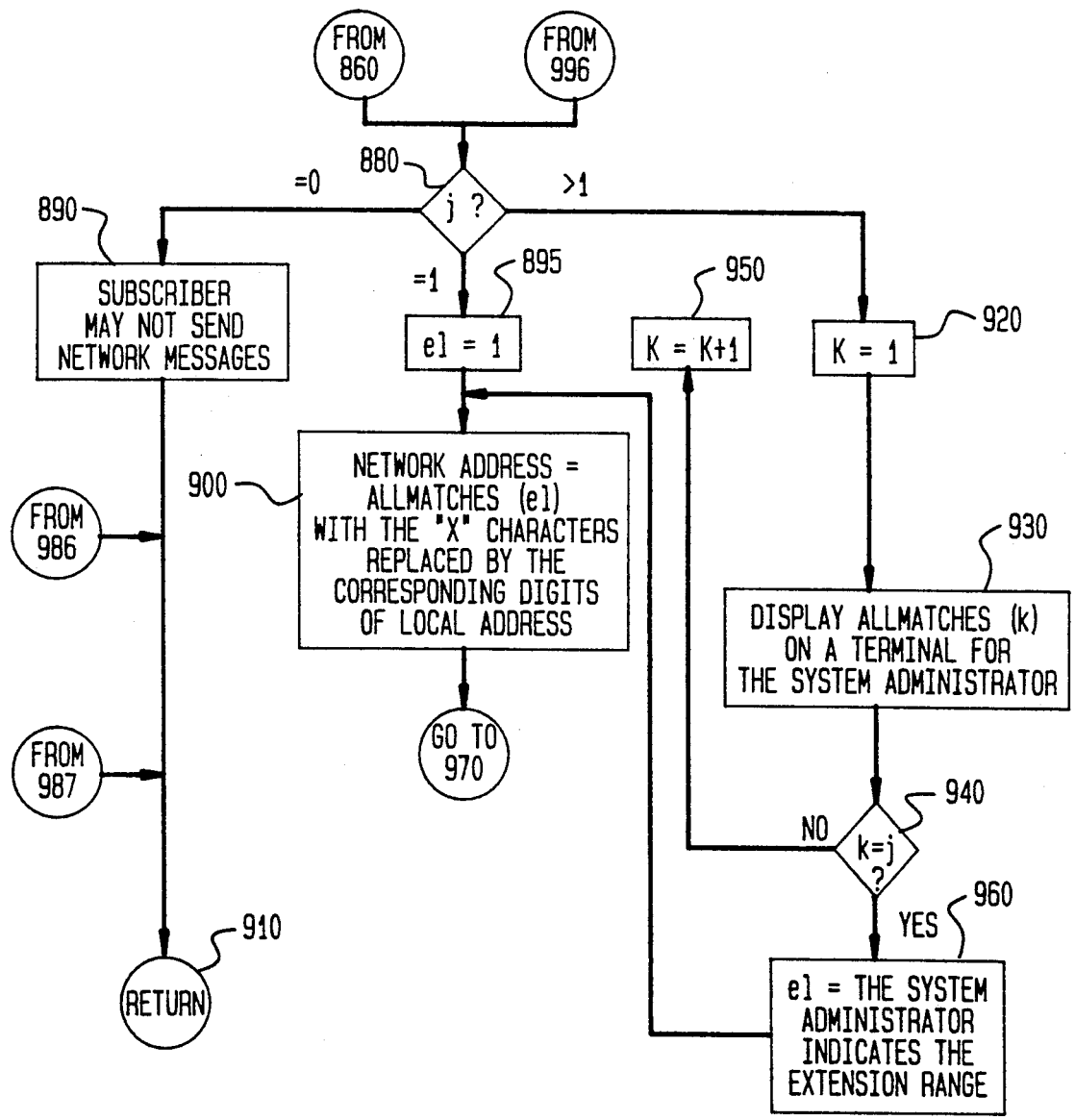
FIG. 3C2

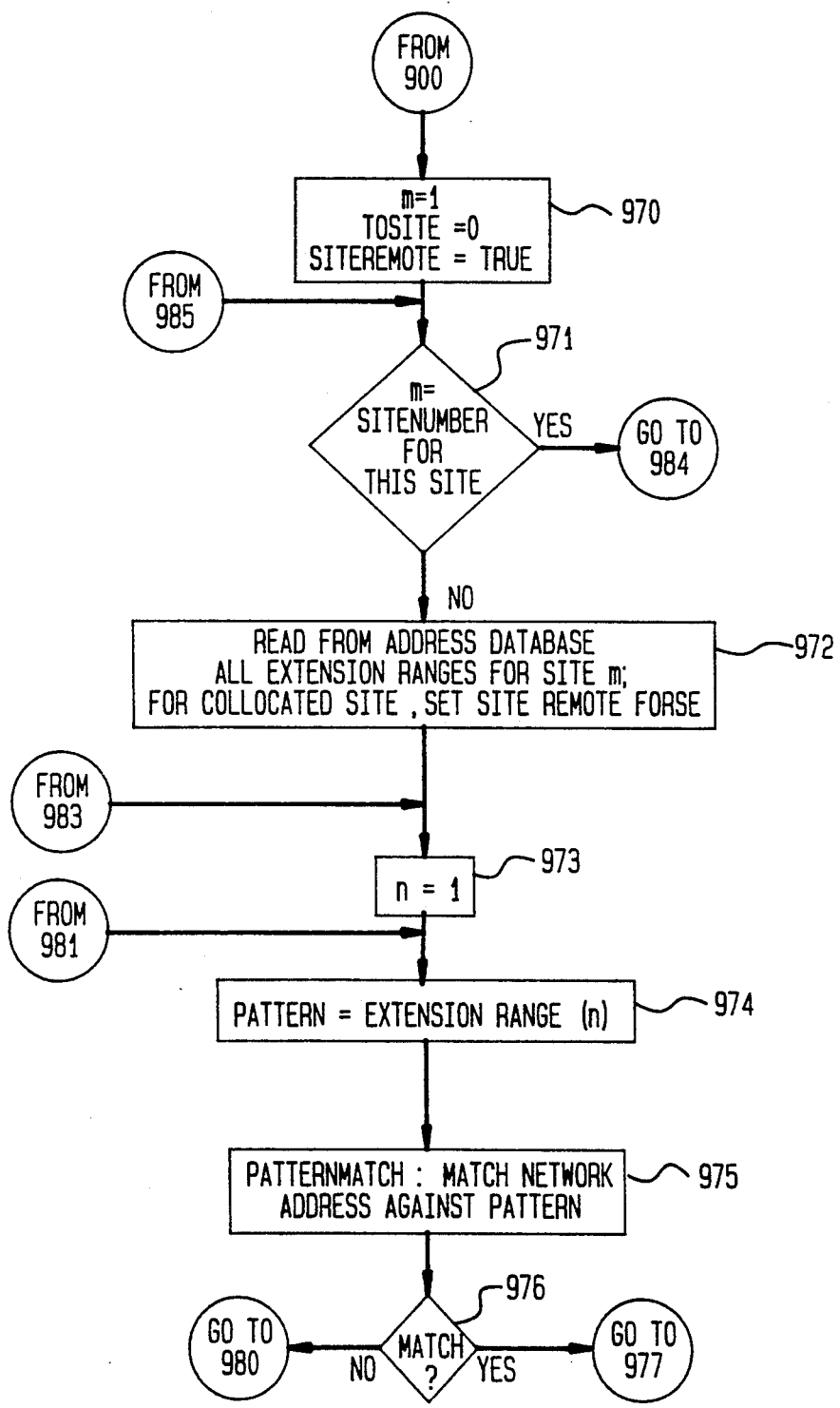
FIG. 3C3

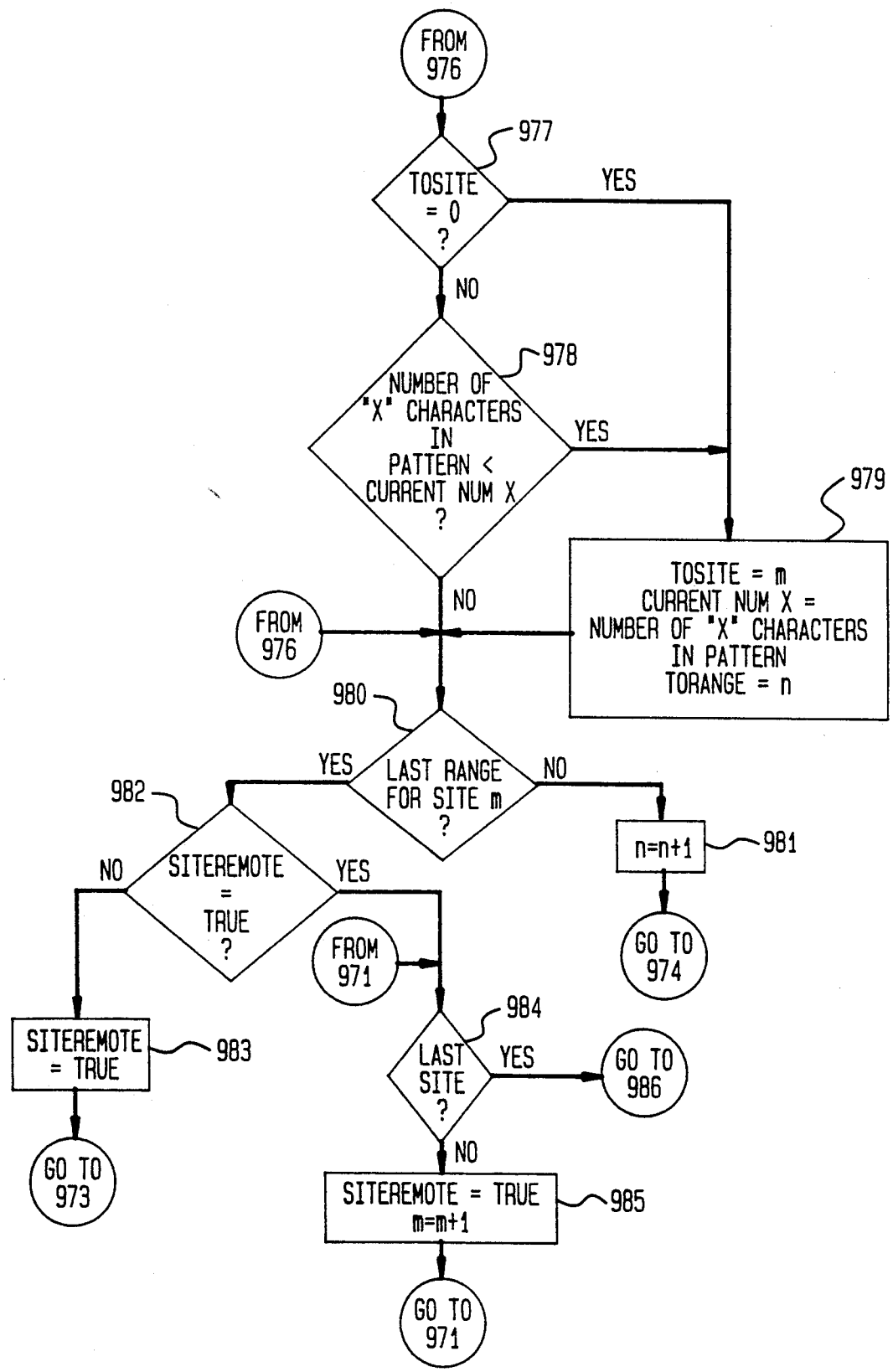
FIG. 3C4

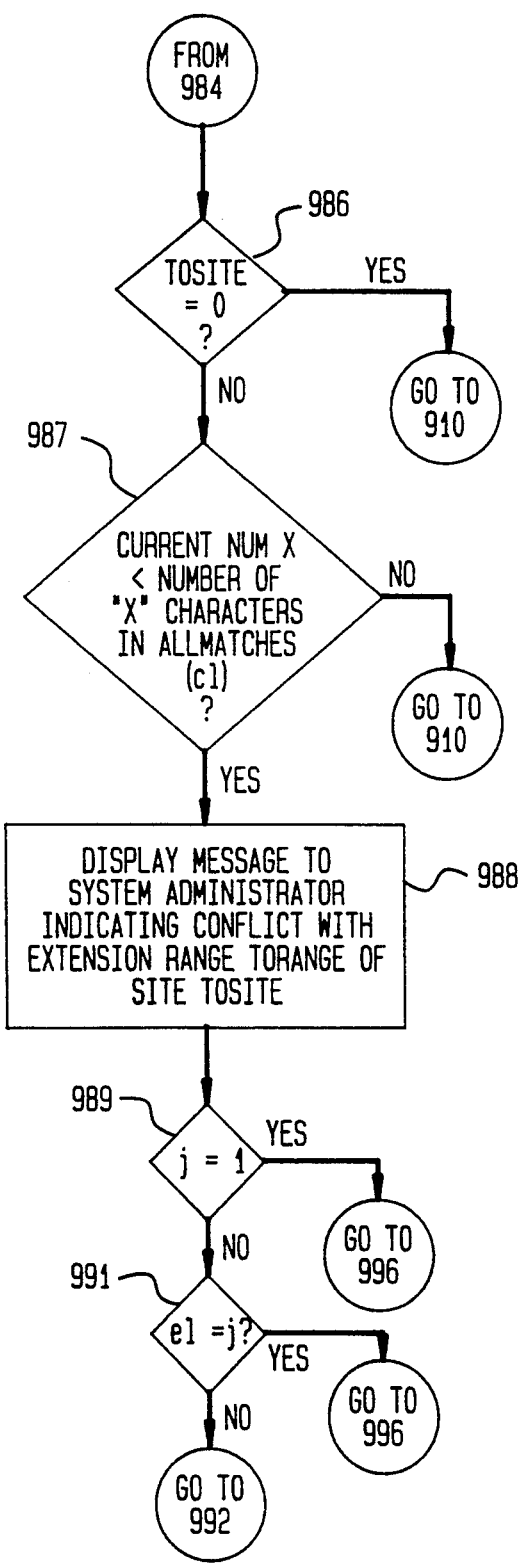
FIG. 3C5

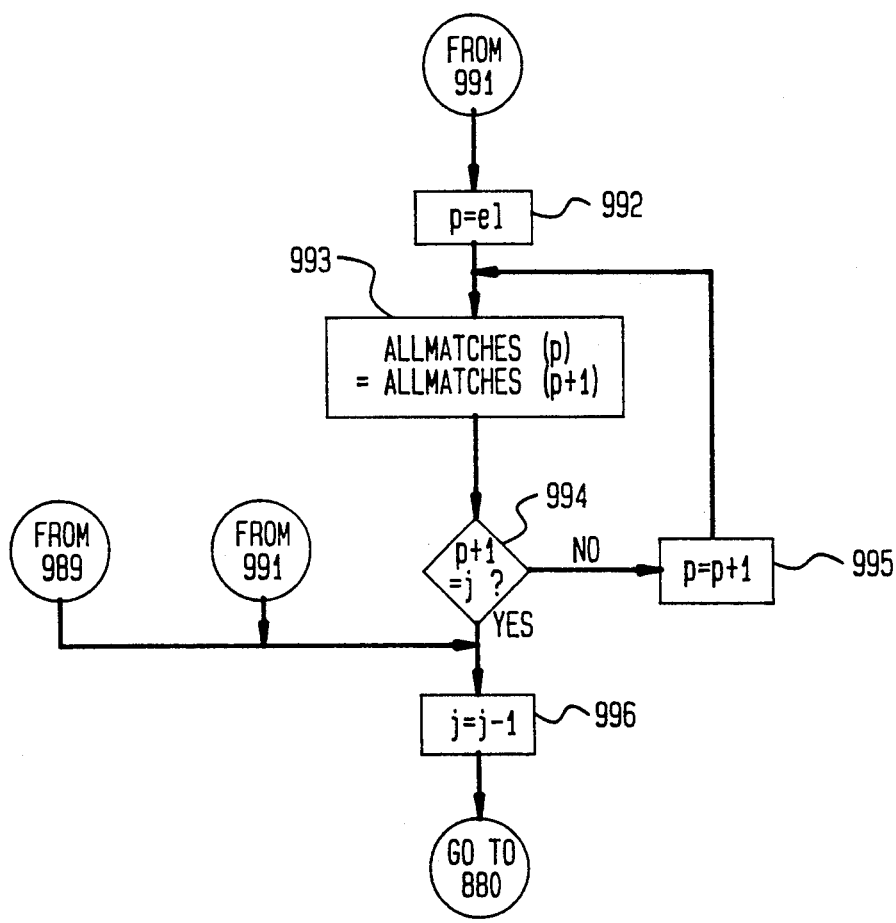
FIG. 3C6

MESSAGE TRANSMITTING SYSTEM WHEREIN RECIPIENT SITE IS DETERMINED USING INFORMATION CONCERNING THE RELATIONSHIP BETWEEN THE SENDER AND RECIPIENT SITES

TECHNICAL FIELD OF THE INVENTION

The present invention pertains to method and apparatus for providing an addressing plan for use in a network of store-and-forward messaging system sites.

BACKGROUND OF THE INVENTION

At present, a typical network of voice store-and-forward messaging system sites utilizes a network addressing plan to provide a network address for users. For example, a message sender uses the network address of a message recipient whenever the message sender sends a message to the message recipient. In addition, the network of voice store-and-forward messaging system sites typically provides the network address of the message sender to the message recipient, for example, by announcement, whenever the message recipient receives the message.

In practice, a network of voice store-and-forward messaging system sites is typically used as an adjunct to a telephone network. At present, in such an arrangement, it is not unusual to find that the network address of the message recipient in the network of voice store-and-forward messaging systems is different from the telephone number of the message recipient.

In a ROLM TM PhoneMail TM network of voice store-and-forward messaging systems manufactured by ROLM Systems of Santa Clara, Calif., two separate network addressing plans have been used, namely, a Location Prefix Plan and a Uniform Addressing Plan. In the Location Prefix Plan, each site in the network is required to define one or more "Location Prefixes," also known as "Location Codes," that uniquely identify a site. Further, in accordance with this plan, the prefixes for every site in the network must have the same length, typically 1-3 digits. In addition, one "Network Identifier," typically one digit, is selected for the whole network to signify a network address—a common choice is the digit "8", and subscriber mailbox addresses for sites in the network may not use this digit as their initial digit. Still further, local extensions and subscriber mailbox addresses for a site must have the same length, typically 3-5 digits, however, the length may vary from site to site over the network.

In the Uniform Addressing Plan, each site in the network is required to define one or more network address extension ranges of the form abcxxx where "a", "b", and "c" are predetermined digits and "x" are digits from 0 to 9. Further, all network address extension ranges in the network must have the same length. Still further, subscriber mailbox addresses for a site must have the same length, however, the length may vary from site to site over the network.

Although the above-described addressing plans work well in certain limited environments, more complex environments are not adequately served by either of them. In particular, a major drawback of the Location Prefix Plan is that all network addresses in the network must begin with the same digit and all location prefixes in the network must have the same length. Further, a major drawback of the Uniform Addressing Plan is that all network addresses in the network must have the same length. Still further, both plans share the following drawbacks: (a) all subscriber mailbox addresses at a site must have the same length and (b) no overlapping of addresses is allowed when specifying either extension ranges or location prefixes.

These drawbacks become apparent when one wishes to "mirror" the telephone numbers of users in a telephone network with the network addresses of users in a network of voice store-and-forward messaging system sites. The term "mirror" means that a message sender can utilize the telephone number of a message recipient as the network address of the message recipient in the network of voice store-and-forward messaging system sites. As one can readily appreciate such a mirroring of telephone numbers in the network addressing plan is advantageous because users would only have to remember one telephone number to place calls over the telephone network and to send messages over the network of voice store-and-forward messaging system sites.

The above-described drawbacks are readily apparent in the following environments: (a) networks of store-and-forward messaging system sites which use public as well as private telephone network facilities and (b) networks comprised of two or more of the following types of sites: (i) collocated sites, i.e., sites located in the same building; (ii) sites in the same area code; (iii) sites located in different area codes, and (iv) international sites.

Some of the above-described drawbacks can be understood in the context of a few simple examples. First, assume that a telephone network comprises public as well as private facilities. In such a telephone network, callers may dial 8-prf-xxxx to telephone called parties at other sites which are connected vi private tie-lines ("prf" refers to a three-digit prefix) whereas callers have to dial seven digits or ten digits—depending on whether the called party is in the same or a different area code, respectively—to utilize the public switched telephone network. This telephone network dialing plan cannot be mirrored in a network of voice store-and-forward messaging system sites by using the Location Prefix Plan or the Uniform Addressing Plan. Second, assume that a telephone network is comprised of only the public switched telephone network and that it comprises multiple sites in the same area codes, sites in different area codes, and even sites in different countries. When a caller places a telephone call, he or she may dial 7, 10, or more than 10 digits—for international calls—depending on the destinations of the calls. Again, this telephone dialing plan cannot be mirrored in a network of voice store-and-forward messaging system sites by using the Location Prefix Plan or the Uniform Addressing Plan.

Attempts in the art to overcome the above-described drawbacks have entailed the use of complicated numbering plans. This has resulted in a new drawback because it has required message system users to use complicated, hard-to-remember sequences of digits to transmit messages.

In light of the above, there is a need in the art for a method and apparatus for providing a universal addressing plan for use in a network of store-and-forward messaging system sites which provides a capability whereby any complex telephone numbering plan can be mirrored among the sites in the network, notwithstanding whether the sites utilize the public switched network or a private network. Further, this capability should include networks which are comprised of: collocated sites; sites located in the same area code; sites located in different area codes; and international sites. Still further, there is a need for method and apparatus for providing such a universal addressing plan wherein network address portability is provided so that a user can retain the same network address whenever he or she moves from one site to another site.

SUMMARY OF THE INVENTION

Embodiments of the present invention advantageously satisfy the above-identified need in the art and provide method and apparatus for providing a universal addressing plan for use in a network of store-and-forward messaging system sites which provides a capability whereby any complex telephone numbering plan can be mirrored among the sites in the network, notwithstanding whether the sites utilize the public switched network or on a private network. Further, this capability includes networks which are comprised of: collocated sites; sites located in the same area code; sites located in different area codes; and international sites. Still further, preferred embodiments of the present invention advantageously provide a universal addressing plan wherein network address portability is provided so that a user can retain the same network address whenever he or she moves from one site to another site. As one can readily appreciate, portability is advantageous because, if a message recipient relocates, his or her correspondents may still use his or her old network address to send messages. Yet still further, preferred embodiments of the present invention advantageously provide a universal addressing plan which mirrors a telephone network dialing plan, i.e., wherein the network address of a message recipient comprises the same set of digits that are used to place telephones calls to that person. As one can readily appreciate, this is advantageous because message senders do not need to remember complex sequences to transmit messages.

Embodiments of the present invention advantageously provide that: (a) network address extension ranges, i.e., a group of related network addresses which relate to one site or which relate to different sites, can have different lengths; (b) a message may be forwarded using either a full network address or a portion thereof, which portion is referred to as a local extension portion, depending on whether the relationship between sites is defined as remote or collocated; (c) local extensions for a particular network address extension range have the same length but local extensions for different network address extensions range can have different lengths; (d) network address extension ranges can share a common prefix—in this case network addresses for the ranges are distinguished on the basis of length; (e) network address extension ranges can overlap; (f) users have different network address extension ranges even though the local extension portions thereof may overlap; and (g) a user may be relocated to another site without having to modify his or her network address.

BRIEF DESCRIPTION OF THE DRAWING

A complete understanding of the present invention may be gained by considering the following detailed description in conjunction with the accompanying drawing, in which:

FIGS. 3A1-3A2, 3B1-3B2, and 3C1-3C6 and 4 comprise a flowchart of software which is used to fabricate a preferred embodiment of the present invention for providing a universal addressing plan in a network of store-and-forward messaging systems.

DETAILED DESCRIPTION

Before describing the operation of a preferred embodiment of the present invention in detail with reference to FIGS. 2, 3A1-3A2, 3B1-3B2, and 3C1-3C6, and 4, we will describe how the preferred embodiment operates in general.

Figure 1:
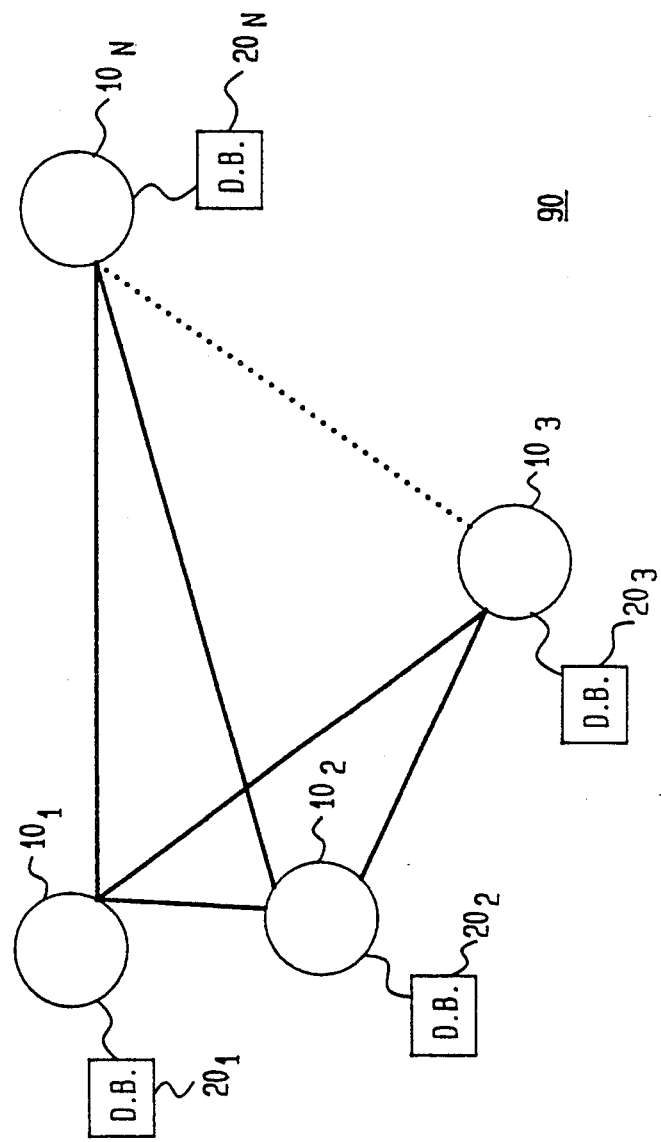
FIG. 1 is a block diagram of an embodiment of the present invention.

As shown in FIG. 1, network 90 is comprised of store-and-forward messaging system sites $10_1$ to $10_n$. Each of store-and-forward message system sites $10_1$ to $10_n$ interacts with local users and is comprised of a local database $20_1$ to $20_n$, respectively. Further, as is shown in FIG. 1, each of store-and-forward messaging system sites $10_1$ to $10_n$ has a communications connection with predetermined ones of the other store-and-forward messaging system sites in network 90. Of course, those of ordinary skill in the art clearly appreciate that the present invention in not restricted to such an embodiment and also covers an embodiment wherein private branch exchanges are utilized so that any node may contact any other node via, for example, the public telephone network.

In accordance with the present invention, whenever a message sender at a first store-and-forward messaging system site sends a message to a message recipient, the first store-and-forward messaging system site transmits the following to a local store-and-forward messaging system site of the message recipient: (a) the message, for example, a voice message; (b) the network address of the message recipient, i.e., the number used by the message sender to address the message recipient; (c) the network address of the message sender, i.e., the number that the message recipient would use to address the message sender; and (d) a site identifier of the message sender.

There are networks which permit users to address message recipients by name, which networks also transmit spoken names for confirmation and so forth. However, those of ordinary skill in the art can readily appreciate that these features may be generated using the present invention by first performing a translation from a user's name to the user's network address.

In accordance with the present invention, a network addressing plan defines network addresses such as, for example, a sequence of digits and/or characters, that a message sender uses when he or she wishes to transmit a message from the message sender to a message recipient. Further, the network addressing plan typically also defines the manner in which the network address of the message sender will be constructed when it is transmitted to the message recipient. Thus, the message sender provides the network address of the message recipient to his or her local voice store-and-forward messaging system site, which local site comprises a portion of a network of voice store-and-forward messaging system sites. In response, the message sender's local site determines the site of the message recipient and the message sender's network address, as it would be used by the message recipient. Finally, the local site makes a physical connection to the message recipient's site in a manner which is well known to those of ordinary skill in the art and transmits the message, the message recipient's network address—as "dialed" by the message sender, and the message sender's network address—as it would be dialed by the message recipient. Upon receipt of this information, the message recipient's site validates the message recipient's address and determines the message recipient's local mailbox number for delivery of the message.

The present invention relates to method and apparatus for providing a universal network addressing plan for use in accomplishing the above-described objectives and the following is a general description of the universal network addressing plan. For each site in the network of voice store-and-forward messaging system sites, one defines one or more network address extension ranges, i.e., a group of related network addresses. Although network address extension ranges need not be comprised solely of consecutive strings of digits and/or characters, in a preferred embodiment of the present invention, a network address extension range takes the form: abcXX, where a, b, c, are predetermined prefix characters and X is a range character which represents a range of digits, for example, 0-9. In accordance with the present invention, a network address extension range may have an arbitrary number of prefix characters, including none, and may have an arbitrary number of range characters, including none, which follow a predetermined prefix, for example, abc. Thus, as an example, the network address extension range 408492XXXX defines all network addresses from 4084920000 to 4084929999. Further, a network address extension range does not need to contain a range character X and, as a result, for example, 4084926551 is a valid network address extension range comprised of a single network address. Still further, in accordance with the present invention, a network address extension range can be of any length, however, there cannot be duplicate ranges. Yet still further, a network address extension range may be comprised of all range characters, i.e., the network address extension range XXXX denotes all network addresses between 0000 and 9999. Yet again still further, if two network address extension ranges share the same prefix, but are of differing lengths, they are considered to be different network address extension ranges and may co-exist in the network. For example, in accordance with this rule, network address extension range 87733XXX is different from network address extension range 87733XXXX.

In accordance with the present invention, if one network address extension range in a network is a proper subset of another, then, in accordance with a "rule of precedence," the network address extension range having fewer range characters, i.e., the one representing fewer network addresses, "takes precedence" over the one representing the larger number of network addresses. The meaning of the term "takes precedence" is understood as follows. Assume that network address extension range 265XX belongs to site #2. As one can readily appreciate, network address extension range 265XX is a subset of network address extension range 2XXXX which belongs to site #1. In accordance with the "rule of precedence," network addresses in the range 26500 to 26599 belong to site #2 and network addresses in the ranges 20000 to 26499 and 26600 to 29999 belong to site #1.

In accordance with the present invention, the rule of precedence which permits overlapping of network address extension ranges also provides address portability. This is accomplished by declaring that a network address extension range belongs to a different site. The users which are assigned to addresses within that range will keep receiving their messages, addressed as before, at the new location. This can be understood as follows. Assume that site #1 has a network address extension range defined by 408492XXXX. Further assume that a user at site #1 has a network address 4084926551. Still further assume that this user moves to site #2. Then, a network address extension range at site #2 is defined to be 4084926551. In accordance with the rule of precedence whereby ranges having fewer range characters take precedence, messages addressed to network address 4084926551 are sent to site #2 and messages addressed to other addresses in the range are sent to site #1.

In accordance with the present invention, one must identify a "local extension portion" of the network address extension range. The local extension portion of a network address identifies a user mailbox at a local site. Although a local extension may be any arbitrary pattern of numbers in a network address, in a preferred embodiment of the present invention, the local extension portion of the network address is defined as the number of digits from the end of the network address. This can be understood as follows. Assume, for example, that one has defined a network address extension range 408492XXXX having a local extension portion which identifies user mailboxes in that network address extension range comprising the last five (5) digits of the network address. This is denoted as 408492XXXX/5. Then, when a message is received from another site which is addressed to 4084929432, upon arrival at the site of message recipient, the message will be transmitted to mailbox 29432 which is identified by the last five (5) digits of the network address. Conversely, when a user having mailbox 29432 sends a message to a message recipient at another site, that message recipient will be informed that the network address of the message sender is 4084929432.

In accordance with the present invention, a local extension portion of a network address may be identical to the full network address. In one such example, this is denoted by 2XXXX/5. In addition, a user mailbox may belong to more than one network address extension range at a particular site. For example, if a site defines network address extension ranges 87733XXX/3 and 9863XXX/3, then it is possible for user mailbox 123 to belong to either one. In this case, in order to avoid ambiguity, a System Administrator must indicate which of the two ranges apply to a particular mailbox for the site. As one can readily appreciate, this is important, in order that message recipients receive the proper address of the message sender.

Lastly, in accordance with the present invention, one needs to define a relationship between sites as being "remote" or "collocated." The rules for specifying network address extension ranges described above applies to an addressing scheme to be used between two sites that are related as remote sites. However, when two sites are related as collocated sites, by definition, when communicating between themselves, they treat each other's network address extension ranges as if they were only comprised of a "local extension portion." In other words, in order to specify delivery of a message to a message recipient at a collocated site, a message sender specifies the message recipient's address using the same set of digits that a message sender at the collocated site would use to send an intra-site message to that message recipient. This may be better understood in accordance with the following example. Assume that site #1 and site #2 are collocated. Further assume that the network address extension range at site #1 is 87733XXXX/5 and that the network address extension range at site #2 is 40849265XX/5. In this environment, a message sender at site #2 will send a message to an intra-site message recipient by using the message recipient's local extension, i.e., a mailbox number having a format of 265XX. Further, because site #1 and site #2 are collocated, a message sender at site #1 will also send a message to a message recipient at site #2 using the message recipient's local extension, i.e., a network address extension having a format of 265XX, and the message recipient is notified that the address of the message sender in this case is the message sender's local extension, i.e., a network address extension having a format of 3XXXX. Of course, messages which are sent to site #2 from sites which are remote from site #2 must be sent using the message recipient's complete network address, i.e., a network address extension having a format of 40849265XX.

In accordance with the present invention, one site may have user mailbox numbers of varying lengths. This is established by appropriately defining the local extension portion of the network address extension ranges for the site.

In addition, when two sites define their relationship as collocated, then the local extension portion of their network address extension ranges are used to detect duplication. For example, if site #1 has a network address extension range defined as 408492XXXX/4 and site #2 has a network address extension range defined as 986XXXX/4, the local extension portions of these two network address extension ranges are the same, i.e., XXXX. As a result, such sites cannot be collocated sites and must be remote. In accordance with the present invention, a site can be remote with respect to one site and collocated with respect to another.

Figure 2:
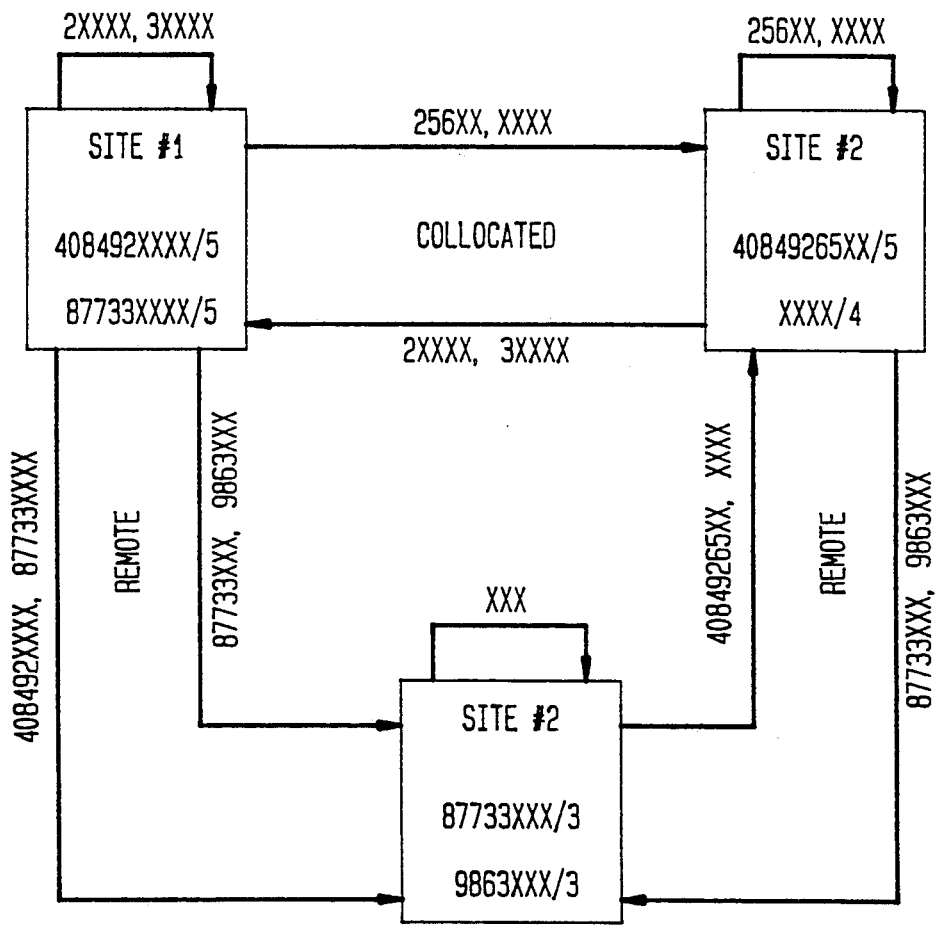
FIG. 2 is a block diagram of a network comprised of three sites for use in understanding a universal addressing plan and an embodiment of the present invention which implements the plan.

FIG. 2 shows a block diagram of a network which illustrates the discussion set forth above. For illustrative purposes, as shown in FIG. 2, network 200 is comprised of three sites, i.e., site #1, site #2, and site #3. Site 1 has network address extension ranges 408492XXXX/5 and 87733XXXX/5; site #2 has network address extension ranges 40849265XX/5 and XXXX/4—note the use of user mailbox numbers having two different lengths at one site, i.e., 4 and 5; and site #3 has network address extension ranges 87733XXX/3 and 9863XXX/3. Further: (a) site #1 is collocated with site #2 and site #1 is remote from site #3; (b) site #2 is collocated with site #1 and site #2 is remote from site #3; and (c) site #3 is remote from sites #1 and #2.

Note the following. First, two network address extension ranges share the same prefix and yet, in accordance with the present invention, they are different because they have different lengths. In particular, note network address extension range 87733XXXX/5 for site #1 and network address extension range 87733XXX/3 for site #3. Second, site #1 and site #2 have overlapping network address extension ranges, i.e., network address extension range 408492XXXX/5 for site #1 and network address extension range 40849265XX/5 for site #2. However, in accordance with the present invention, since the network address extension range definition for site #2 contains fewer range characters X, it takes precedence, i.e., network addresses in the range 4084926500-4084926599 are used for site #2 whereas network addresses in the ranges 4084920000-4084926499 and 4084926600-4084929999 are used for site #1. Third, site #2 has a network address extension range comprised of all range characters X, i.e., XXXX/4. In addition, the local extension portion thereof is comprised of the complete network address extension range, i.e., user mailbox numbers are the same as the network addresses. Fourth, user mailboxes at site #3 are of the form XXX. As a result, they may belong to either one of the two network address extension ranges defined for that site. Therefore, it is important that a System Administrator identify, for each user mailbox, which range applies: 87733XXX or 9863XXX.

The arrows in FIG. 2 show the format used to address messages from one user to another subscriber, both intra- and inter-site. Thus, for example, to send a message from site #1 to a user at site #2, it might be addressed as 26551. To address a message to this same user from site #3, the format would be 4084926551.

The manner in which the universal addressing plan provides address portability can best be understood in the context of an example which refers to FIG. 2. Assume a user has local address, i.e., mailbox number, 26551 at site #2 and that the user relocates to site #1. Network address portability results when a network address extension range 4084926551/5 is established by the System Administrator for site #1. Then, users at site #1 and site #2 may continue to send messages to the relocated user by entering 26551 since these two sites are collocated. Further, users at site #3 may continue to send messages to the relocated user by entering 4084926551. As a result, no one has to change the relocated user's address.

If, however, the same user had relocated from site #2 to site #3 instead of to site #1 as above, then portability would have been slightly less transparent. In this case, the user may retain his or her old mailbox number just like above and the System Administrator would define a network address extension range 4084926551/5 at site #3. However, in this case users at site #1 and site #2 must use the full ten digit network address 4084926551 to send messages to the relocated subscriber and users at site #3 need only use the five digit local extension. However, if the network comprised a further multiplicity of sites, up to and including site #n where n is a fairly large number, which were remote to the original three sites shown in FIG. 2, then users at those sites would not have to change their dialing to send messages to the relocated user.

An apparatus fabricated in accordance with a preferred embodiment of the present invention for use in connection with a network of voice store-and-forward messaging system sites comprises: (a) an address database which is comprised of network address extension ranges which are assigned to each site in the network; (b) a user database which is comprised of the network address and local mailbox number for each user; (c) a site database which is comprised of designations of remote and collocated sites with respect to each site in the network; and (d) a translation processor for use in translating network addresses in accordance with the universal addressing plan. In accordance with the invention, the implementation of the translations which are needed to embody the universal addressing plan may be performed on a centralized basis wherein a single database and a single translation processor exists for use by all of the sites in the network. However, in a preferred embodiment of the present invention, the databases are distributed and the translation processor function is distributed to all of the sites. As such, in a preferred embodiment, each site comprises: (a) an identical copy of the address database of network address extension ranges for each site in the network; (b) a portion of the user database which is comprised of the network address and local mailbox number for each user who is local to the site; (c) a portion of the site database which is comprised of designations of remote and collocated sites with respect to each site in the network for the site; and (d) a translation processor. This arrangement is preferred for two reasons. First, the translation process is speeded up by the distributed arrangement and, second, sites typically have processing power in their already-existing processors which is available for use in performing the translation function.

Thus, in accordance with the above-described preferred embodiment, as a new network address extension range is defined for use at a particular site, this information is communicated to all other sites. This occurs whenever a new site joins the network or whenever new network address extension ranges are added to a site from time to time. Further, as a network is built and sites are added, one site at a time, existing sites are given precedence over newly arrived ones when range conflicts are found. As a result, conflicting ranges from newly attached sites are rejected.

Since the address database at every site contains information relating to network address extension ranges for all other sites and the site database contains information defining the relationships among the sites, i.e., whether they are remote or collocated with respect to one another, the translation processors at each site are able to provide information which is used by the sites in routing messages and transmitting network addresses of message senders and recipients.

In the preferred embodiment of the present invention, a translation processor is a processor such as, for example, a computer, which accesses the address database, the user database, and the site database and executes translation software which performs in accordance with the following description and in accordance with the flowcharts shown in FIGS. 3A1-3A2, 3B1-3B2, 3C1-3C6.

Assume that a message sender has logged onto the network at his or her local site. The local site accesses the user database and retrieves the network address and the local mailbox number of the message sender. The message sender may then record a voice message for transmittal to a message recipient in a manner which is well known to those of ordinary skill in the art and then enters an address of the message recipient. FIG. 3A1-3A2 shows a flowchart of a translation process that is performed whenever the message sender records a voice message and provides a network address for use in transmitting the message to a message recipient. In general, the message recipient's address must be validated and the translation processor must determine the recipient's site. Of course, the address of the message recipient could be an address of a local mailbox rather than the network address of another site and this could be checked either before or after the execution of the process whose flowchart is shown in FIG. 3A1-3A2. This checking process comprises the translation processor accessing the user database using the address as a key in a manner which is well known to those of ordinary skill in the art to determine whether there is a match. If there is a match between the address entered by the message sender and an entry in the user database for that site, then the message recipient has a local mailbox at that site and that local mailbox is retrieved from the user database and it is used as the address of the message recipient for delivery of the message. At the same time, the address of the message sender which is delivered to the message recipient along with the message is the message sender's local mailbox number which was also retrieved from the user database. If the message recipient's site is not the same as that of the message sender, the message recipient's site is determined after the translation processor executes the steps shown in the flowchart of FIG. 3A1-3A2. Site numbers start from 1 (one); no site can be site 0 (zero). The message recipient's site is used as a key to determining a physical address of the message recipient and the two sites communicate in a manner which is well known to those of ordinary skill in the art to transmit the message. Further, the message sender's site and the message recipient's site are used as keys into the site database to determine whether the two sites are collocated or remote with respect to each other. If they are remote, the message sender's network address is transmitted to the message recipient's site, whereas, if they are collocated, the message sender's local mailbox number is transmitted to the message recipient's site. Of course, if the network address is invalid, the network will take appropriate actions which are well known to those of ordinary skill in the art for informing the user that an invalid address has been entered.

Assume a message is received by a message recipient's site, the site must validate the message recipient's network address to determine his or her local mailbox number. FIG. 3B shows a flowchart of a translation process that is performed whenever a message is received at a recipient's site for determining whether the network address is valid and, if it is valid, for determining the local extension, i.e., mailbox number of the recipient. Of course, if the network address is invalid, the network will take appropriate actions which are well known to those of ordinary skill in the art for informing a user that an invalid address has been entered. The translation processor uses the message sender's site identifier, i.e., number, and the transmitted message recipient's network address as keys to access the site database and the address database, respectively, to determine the local mailbox extension relating to the transmitted information. Then, the translation processor uses that local mailbox number to access the user database at the message recipient's site to determine whether it had been assigned to a message recipient.

Lastly, FIG. 3C1-3C6 shows a flowchart of a user database process that is performed to provide a network address for a user, given his or her local extension, i.e., mailbox number, when the user database is updated. This process is executed by the System Administrator when adding new users or modifying mailbox numbers for existing users. As has been described above, the user database is used at a sending site to transfer the network address of the message sender to the message recipient's site. Note, in accordance with the present invention, if a sender's site and a recipient's site are collocated, then the sending site merely needs to send the local extension of the sender to the recipient's site and not the sender's full network address.

The following describes the flowchart of FIG. 3A1-3A2. Control is transferred to box 400 of FIG. 3A1 after a message sender has recorded a message and provided an address for the message recipient by entering the address by, for example, using a telephone keypad. The manner in which the keypad strokes are transformed into a string of digits is well known to those of ordinary skill in the art. The input digits are transferred to the translation routine at box 400 of FIG. 3A1 to determine a site number for the address provided. As an example, assume that the input address was 4084926551. Then, control is transferred to box 410 of FIG. 3A1.

At box 410 of FIG. 3A, the program initializes a loop variable and a site identifier parameter, i.e., it sets $i=1$ and tosite=0 (Note that if, at the end of the routine, tosite=0, then the address is invalid.). Then, control is transferred to decision box 420.

At decision box 420 of FIG. 3A1, the program determines whether i equals the site number for this site, i.e., the message sender's site. If so, control is transferred to decision box 440 of FIG. 3A1, otherwise, control is transferred to box 430 of FIG. 3A1.

At decision box 440 of FIG. 3A1, the program determines whether this is the last site in the network. If so, control is transferred to 560 of FIG. 3A2, otherwise, control is transferred to box 450 of FIG. 3A1.

At box 450 of FIG. 3A1, counter i is incremented by 1. Then, control is transferred to decision box 420 of FIG. 3A1.

At box 430 of FIG. 3A1, the program accesses the address database and obtains all the extension ranges for site i. Then, control is transferred to box 460 of FIG. 3A1.

At box 460 of FIG. 3A1, the program initializes a loop variable j to 1. Then, control is transferred to box 470 of FIG. 3A1.

At box 470 of FIG. 3A1, the program sets the variable pattern equal to the network address extension range for the $j^{th}$ such range assigned to site i. The program accesses the site database to determine whether site i is remote from the sender's site. This is done, in one embodiment, by reviewing a table of collocated sites. If site i is remote from the sender's site, then the network address extension range is the entire range. However, if site i is collocated with the sender's site, then the local portion of the network address extension range is used. In this case, for example, as shown in FIG. 2, if a message sender sends a message to site #2, the network address extension range used would be 40849265XX for a remote site and 265XX for a collocated site. Then, control is transferred to box 480 of FIG. 3A.

Figure 4:
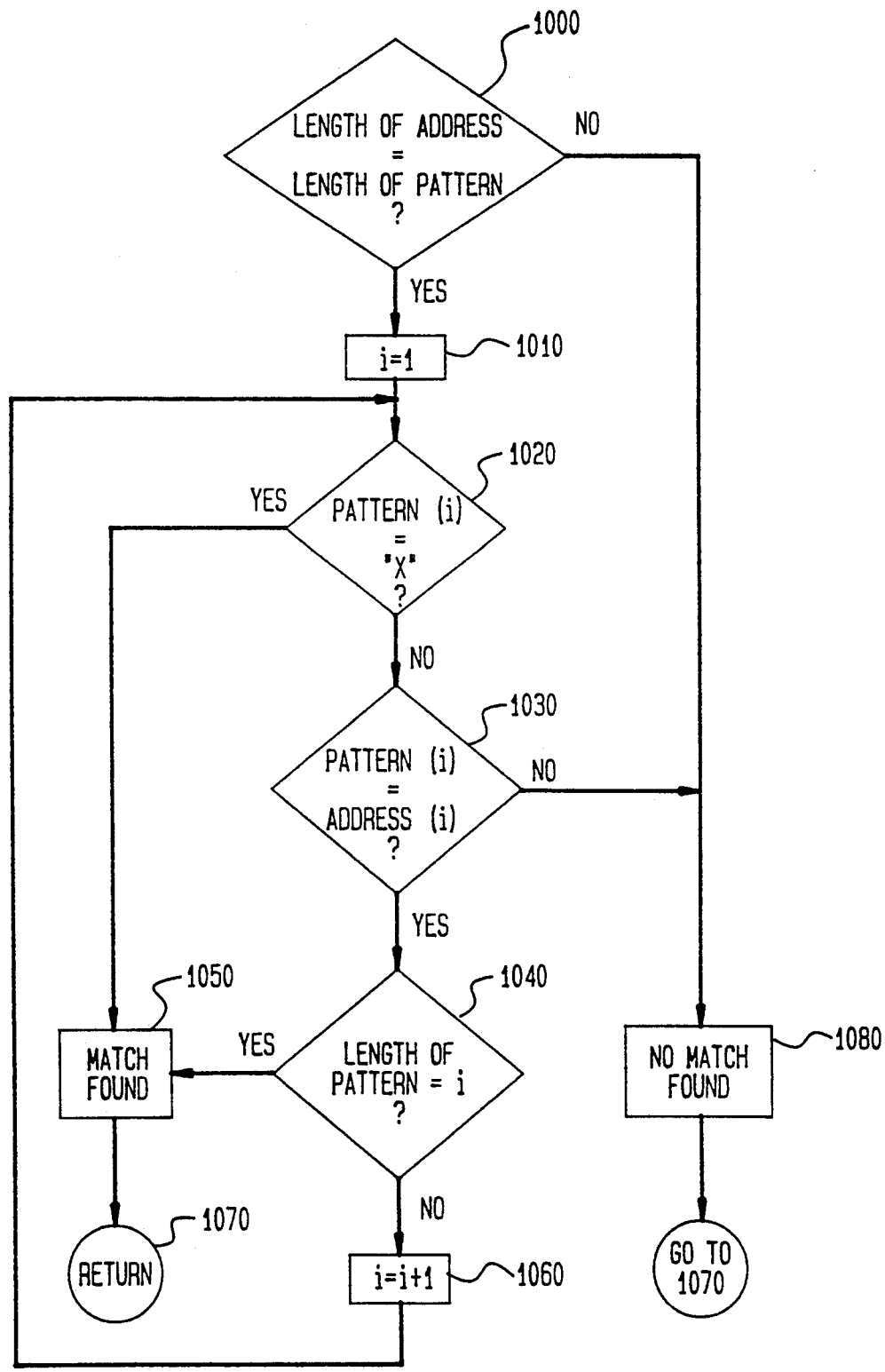

At box 480 of FIG. 3A1, a pattern matching routine, Patternmatch, compares the user input with the pattern variable set up in box 470 of FIG. 3A1. A flowchart of the pattern matching routine is shown in FIG. 4. The routine sets a flag if a match is found. Then, control is transferred to decision box 490 of FIG. 3A1.

At decision box 490 of FIG. 3A1, the program determines whether there is a match. If so, control is transferred to decision box 500 of FIG. 3A2, otherwise, control is transferred to decision box 530 of FIG. 3A2.

At decision box 500 of FIG. 3A2, the program determines whether tosite=0. If so, control is transferred to box 510 of FIG. 3A2, otherwise, control is transferred to decision box 520 of FIG. 3A2.

At box 510 of FIG. 3A2, the program sets tosite=i and sets variable currentnumx equal to the number of "X" characters in the pattern. Then, control is transferred to decision box 530 of FIG. 3A2.

At decision box 520 of FIG. 3A2, the program determines whether the number of "X" characters in the pattern is less than variable currentnumx. If so, control is transferred to box 510 of FIG. 3A2, otherwise, control is transferred to decision box 530 of FIG. 3A2.

At decision box 530 of FIG. 3A2, the program determines whether the present value of j corresponds to the last network address extension range for site i. If so, control is transferred to decision box 550 of FIG. 3A2, otherwise, control is transferred to box 540 of FIG. 3A2.

At box 540 of FIG. 3A2, the program, increments j. Then, control is transferred to box 470 of FIG. 3A1.

At decision box 550 of FIG. 3A2, the program determines whether this is the last site in the network. If so, control is transferred to box 560 of FIG. 3A2, otherwise, control is transferred to box 450 of FIG. 3A1.

At decision box 560 of FIG. 3A2, the program returns the site number of the message recipient's site as variable tosite. If tosite=0, the message recipient's address is invalid. Then, control is transferred to box 570 to return.

The message sender's site uses the site number of the message receiver's site which it has just received from the translation processor as a key to access a table or a database which translates the logical site number into information which can be used to provide a physical connection between the sites. Of course, as has been described above, if the message recipient's site is the same as that of the message sender, then the message is transferred to the message recipient's local mailbox.

FIG. 3B1-3B3 shows a flowchart of a translation process that is performed whenever a message is received at a message recipient's site for determining whether the message recipient's network address is valid and, if it is valid, for determining the local extension, i.e., local mailbox number, of the message recipient, i.e., it examines the network address of the message recipient to determine the local address of the message recipient. Then, if the message recipient's address is valid, the message recipient's site delivers the message to the message recipient along with the network address of the message sender.

The following describes the flowchart of FIG. 3B1-3B3. Control is transferred to box 600 of FIG. 3B1 after a message is received. The site number of the message sender and the network address of the message recipient are transferred to the translation routine at box 600 of FIG. 3B1. Then, control is transferred to decision box 610.

At decision box 610 of FIG. 3B1, the program accesses the site database to determine whether the message sender's site is collocated with the message recipient's site; in one embodiment, this is done by reviewing a table of collocated sites. If so, control is transferred to box 620 of FIG. 3B1, otherwise, control is transferred to box 630 of FIG. 3B1.

At box 620 of FIG. 3B1, the program sets a variable localaddress equal to the message recipient's network address. Then, control is transferred to decision box 720 of FIG. 3B3.

At box 630 of FIG. 3B1, the program accesses the address database and obtains all the extension ranges for the message recipient's site. Then, control is transferred to box 640 of FIG. 3B1.

At box 640 of FIG. 3B1, the program initializes a loop variable and a range identifier parameter, i.e., it sets $j=1$ and torange=0. Then, control is transferred to box 650 of FIG. 3B1.

At 650 of FIG. 3B, the program sets a variable, i.e., pattern, equal to the network address extension range for the $j^{th}$ such range assigned to the message recipient's site. Then, control is transferred to box 660 of FIG. 3B1.

At box 660 of FIG. 3B1, pattern matching routine Patternmatch compares the message recipient's network address received from the message sender with pattern. Patternmatch sets a flag if a match is found. Then, control is transferred to decision box 670.

At decision box 670 of FIG. 3B1, the program determines whether there is a match. If so, control is transferred to decision box 691 of FIG. 3B2, otherwise, control is transferred to decision box 680 of FIG. 3B1.

At decision box 680 of FIG. 3B1, the program determines whether this is the last address extension range for the message recipient's site. If so, control is transferred to box 695 of FIG. 3B2, otherwise, control is transferred to box 690 of FIG. 3B2.

At box 690 of FIG. 3B2, the program increments j. Then, control is transferred to box 650 of FIG. 3B1.

At decision box 691 of FIG. 3B2, the program determines whether torange=0. If so, then control is transferred to box 693 of FIG. 3B2, otherwise, control is transferred to decision box 692 of FIG. 3B2.

At decision box 692 of FIG. 3B2, the program determines whether the number of "X" characters in the pattern is less than variable CurrentNumx. If so, control is transferred to box 693 of FIG. 3B2, otherwise, control is transferred to decision box 680 of FIG. 3B1.

At box 693 of FIG. 3B2, the program sets torange=j and sets variable CurrentNumx equal to the number of "X" characters in the pattern. Then, control is transferred to decision box 680 of FIG. 3B1.

At decision box 695 of FIG. 3B2, the program determines whether torange=0. If so, then control is transferred to box 750 of FIG. 3B3, otherwise, control is transferred to box 700 of FIG. 3B3.

At box 700 of FIG. 3B, the program sets variable L equal to the number of digits in the local portion of extension range torange, i.e., if the extension range is 40849265XX/5 then L=5. Then, control is transferred to box 710 of FIG. 3B.

At box 710, variable LocalAddress is set equal to the L rightmost digits of the recipient's network address. Then, control is transferred to decision box 720.

At decision box 720, the program determines whether anyone at the message recipient's site has been assigned the address corresponding to the address in variable LocalAddress by using the variable LocalAddress as a retrieval key to the user database. If so, then control is transferred to box 730 of FIG. 3B, otherwise, control is transferred to box 750 of FIG. 3B.

At box 730 of FIG. 3B, the program returns a flag to indicate that the recipient's network address is valid. The message is delivered to the message recipient which was found. Then, control is transferred to box 740 of FIG. 3B to return.

At box 750 of FIG. 3B, the program returns a flag to indicate that the recipient's network address is invalid. Then, control is transferred to box 740 of FIG. 3B to return.

FIG. 3C shows a flowchart of a user database update process that is executed when a System Administrator adds a subscriber or modifies a mailbox, i.e., it modifies the network address of the user given the user's local address, i.e., the local mailbox number.

At box 800 of FIG. 3C, the program accesses the address database and obtains all the extension ranges for the site to be updated. Then, control is transferred to box 810 of FIG. 3C.

At box 810 of FIG. 3C, the program initializes loop variable i=1 and counter j=0. Then, control is transferred to box 820 of FIG. 3C.

At box 820 of FIG. 3C, the program sets a variable pattern equal to the local portion of the network address extension range for the $i^{th}$ such range assigned to the site to be updated. Then, control is transferred to box 830 of FIG. 3C.

At box 830 of FIG. 3C, pattern matching routine Patternmatch compares the local address to be updated with variable pattern set up in box 820 of FIG. 3C. Then, control is transferred to decision box 840.

At decision box 840 of FIG. 3C, the program determines whether there is a match. If so, control is transferred to box 850 of FIG. 3C, otherwise, control is transferred to decision box 860 of FIG. 3C.

At box 850 of FIG. 3C, the program increments counter j and stores the $i^{th}$ extension range in the $j^{th}$ position of vector Allmatches. Then, control is transferred to decision box 860 of FIG. 3C.

At decision box 860 of FIG. 3C, the program determines whether this is the last extension range for the site which is being updated. If so, control is transferred to decision box 880 of FIG. 3C, otherwise, control is transferred to box 870 of FIG. 3C.

At box 870 of FIG. 3C, the program increments i. Then, control is transferred to box 820 of FIG. 3C.

At decision box 880 of FIG. 3C, the program branches on the value of j. If j=0, control is transferred to box 890 of FIG. 3C; if j>1, control is transferred to box 920 of FIG. 3C; and if j=1, control is transferred to box 895 of FIG. 3C.

At box 890 of FIG. 3C, the program has decided that a subscriber may not send network messages because his local address, i.e., mailbox number, does not belong to any of the extension ranges for the site being updated (but he may still be able to send local messages). Then, control is transferred to box 910 of FIG. 3C to return.

At box 895 of FIG. 3C, the program sets variable el to 1. Then, control is transferred to box 900 of FIG. 3C.

At box 900 of FIG. 3C, the program sets the network address of the user to be updated to Allmatches(el), with the "X" characters in Allmatches(el) being replaced by the corresponding digits of the local address. We have now determined a provisional network address for the user, given the local address of the user. We now must determine if this network address is valid. For example, the network address would be invalid if it belonged to another site. This could occur in accordance with the "rule of precedence" if the network address were contained within a network address extension range at another site which is a proper subset of the network address extension range found at this site. Control is thus passed to box 970 of FIG. 3C.

At box 920 of FIG. 3C, the program sets loop variable k=1. Then, control is transferred to box 930 of FIG. 3C.

At box 930 of FIG. 3C, the program displays Allmatches(k) for the System Administrator. Then, control is transferred to decision box 940 of FIG. 3C.

At decision box 940 of FIG. 3C, the program determines whether k =j. If so, control is transferred to box 960 of FIG. 3C, otherwise, control is transferred to box 950 of FIG. 3C.

At box 950 of FIG. 3C, the program increments k by 1. Then, control is transferred to box 930 of FIG. 3C.

At box 960 of FIG. 3C, the program sets el equal to the extension range indicated by the System Administrator. The System Administrator has now indicated which of all the candidate network address extension ranges should be assigned to this user. Then, control is transferred to box 900 of FIG. 3C.

At box 970 of FIG. 3C, the program initializes a loop variable, a site identifier parameter, and an indicator that the identified site is remote, i.e., it sets m=1, tosite=0, and siteremote to TRUE. If, when the loop exit is reached, tosite=0, then there were no conflicting network address extension ranges, and the provisional network address may be assigned to the user. Then, control is transferred to decision box 971.

At decision box 971 of FIG. 3C, the program determines whether m equals the site number for this site, i.e., the site at which the System Administrator is attempting to add a new network user. If so, control is transferred to decision box 984 of FIG. 3C, otherwise, control is transferred to box 972 of FIG. 3C.

At box 972 of FIG. 3C, the program accesses the address database and obtains all the extension ranges for site m. The program accesses the site database to determine whether site m is remote from this site. This is done, in one embodiment, by reviewing a table of collocated sites. For the case that site m is collocated with this site, set variable site remote to FALSE (note that this variable will always be TRUE on entering box 972 of FIG. 3C). Then, control is transferred to box 973 of FIG. 3C.

Note that it is possible, if site m is collocated with this site, for the local portion of a network address to belong to site m, while the complete network address belongs to this site. For example, the local site might have a network address extension range 92xx/3, while collocated site m might have a network address extension range 826x/3. In this case, local address 261 would not be allowed for this site. Therefore, the local address needs to be checked for a collocated site.

Note also that it is possible, if site m is collocated with this site, for a complete network address to belong to site m, while the local portion of the network address belongs to this site. Consider, for example, the case that this site has extension range 92xxx/4 and collocated site m has extension range 926xx/3. In this case, local address 2651 would belong to this site, but the complete network address would be 92651, which belongs to site m. Thus, when a message is addressed to 92651 from a third site remote to both this site and site m, the message will be delivered to site m. Thus, local address 2651 would not be allowed for this site. Therefore, the complete network address also needs to be checked for a collocated site.

At box 973 of FIG. 3C, the program initializes a loop variable n to 1. Then, control is transferred to box 974 of FIG. 3C.

At box 974 of FIG. 3C, the program sets the variable pattern equal to the network address extension range for the jth such range assigned to site m. If siteremote is TRUE, then the entire network address extension is used. However, if siteremote is FALSE, only the local portion of the network address extension range is used. Then, control is transferred to box 975 of FIG. 3C.

At box 975 of FIG. 3C, pattern matching routine Patternmatch compares the provisional network address—determined in box 900 of FIG. 3C (if siteremote is TRUE)—or the local address—as input to FIG. 3C (if siteremote is FALSE)—with the pattern set up in box 974 of FIG. 3C. The routine sets a flag if a match is found. Then, control is transferred to decision box 976 of FIG. 3C.

At decision box 976 of FIG. 3C, the program determines whether there is a match. If so, control is transferred to decision box 977 of FIG. 3C, otherwise, control is transferred to decision box 980 of FIG. 3C.

At decision box 977 of FIG. 3C, the program determines whether tosite=0. If so, control is transferred to box 979 of FIG. 3C, otherwise, control is transferred to decision box 978 of FIG. 3C.

At decision box 978 of FIG. 3C, the program determines whether the number of "X" characters in the pattern is less than variable CurrentNumx. If so, control is transferred to box 979 of FIG. 3C, otherwise, control is transferred to decision box 980 of FIG. 3C.

At box 979 of FIG. 3C, the program sets tosite=m, sets torange=n, and sets variable CurrentNumx equal to the number of "X" characters in the pattern. Then, control is transferred to decision box 980 of FIG. 3C.

At decision box 980 of FIG. 3C, the program determines whether the present value of n corresponds to the last network address extension range for site m. If so, control is transferred to decision box 982 of FIG. 3C, otherwise, control is transferred to box 981 of FIG. 3C.

At box 981 of FIG. 3C, the program increments n. Then, control is transferred to box 974 of FIG. 3C.

At decision box 982 of FIG. 3C, the program determines whether the present value of variable siteremote is TRUE. If so, control is transferred to decision box 984 of FIG. 3C, otherwise, control is transferred to box 983 of FIG. 3C.

At box 983 of FIG. 3C, the program sets variable siteremote to TRUE, so that the next loop through all the network address extension ranges of site m will use the complete network address extension ranges (as the loop which has just completed used the local portion of these network address extension ranges). Then, control is transferred to box 973 of FIG. 3C.

At decision box 984 of FIG. 3C, the program determines whether this is the last site in the network. If so, control is transferred to decision box 986 of FIG. 3C, otherwise, control is transferred to box 985 of FIG. 3C.

At box 985 of FIG. 3C, the program increments m and sets siteremote to TRUE. Note that siteremote will always be TRUE on entering this box, but it is set here to make it obvious that siteremote is TRUE on entering box 972. Then, control is transferred to decision box 971 of FIG. 3C.

At decision box 986 of FIG. 3C, the program determines whether tosite=0. If so, there are no conflicting network address extension ranges in the network, and the provisional network address assigned to the user is valid. We have now determined the network address of the user, given his or her local address, i.e., mailbox number. Then, the user database is updated with this information. Finally, control is transferred to box 910 of FIG. 3C to return. If tosite is not zero, control is transferred to decision box 987 of FIG. 3C.

At decision box 987 of FIG. 3C, the program determines whether variable CurrentNumx is less than the number of "X" characters in the pattern Allmatches(el). If so, there is a conflicting extension range at site tosite, and control is transferred to box 988 of FIG. 3C, otherwise, there are no conflicting network address extension ranges in the network, and the provisional network address assigned to the user is valid.

We have now determined the network address of the user, given his or her local address, i.e., mailbox number. Then, the user database is updated with this information. Finally, control is transferred to box 910 of FIG. 3C to return.

At box 988 of FIG. 3C, the program displays messages to the System Administrator, indicating that the proposed Network Address conflicts with extension range torange of site tosite (displaying the proposed Network Address, extension range torange, and tosite). Then, control is transferred to decision box 989 of FIG. 3C.

At box 989 of FIG. 3C, the program determines whether j=1 (where j is the number of network address extension ranges at this site to which the local address of the user could belong). If so, control is transferred to box 996 of FIG. 3C, otherwise, control is transferred to decision box 991 of FIG. 3C.

At decision box 991 of FIG. 3C, the program determines whether el (the extension range chosen by the System Administrator) is equal to j. If so, control is transferred to box 996 of FIG. 3C, otherwise, control is transferred to box 992 of FIG. 3C.

At box 992 of FIG. 3C, the program sets loop variable p to el. A loop will be made to eliminate Allmatches(el), which did not provide a valid network address. Then, control is transferred to box 993 of FIG. 3C.

At box 993 of FIG. 3C, the program sets Allmatches(p) to Allmatches(p+1). Then, control is transferred to decision box 994 of FIG. 3C.

At decision box 994 of FIG. 3C, the program determines whether p+1 is equal to j. If so, then the loop is complete, and control is transferred to box 996 of FIG. 3C, otherwise, control is transferred to box 995 of FIG. 3C.

At box 995 of FIG. 3C, the program increments p. Then, control is transferred to box 993 of FIG. 3C to continue the loop.

At box 996 of FIG. 3C, the program decrements j by 1, thus reducing the number of possible network address extension ranges at this site to which the local address could belong. Then, control is transferred to decision box 880 of FIG. 3C.

FIG. 4 shows a flowchart of routine Patternmatch described above where, for example, the address is 4084926551 and the pattern is 40849265XX.

At decision box 1000 of FIG. 4, the program determines whether the length of the address in digits or characters is equal to the length of the pattern. If so, control is transferred to box 1010 of FIG. 4, otherwise, control is transferred to box 1080 of FIG. 4.

At box 1010 of FIG. 4, the program initializes loop variable i=1. Then, control is transferred to decision box 1020 of FIG. 4.

At decision box 1020 of FIG. 4, the program determines whether the $i^{th}$ digit or character in pattern (where the first digit is the leftmost) equals an "X". If so, control is transferred to box 1050 of FIG. 4, otherwise, control is transferred to decision box 1030 of FIG. 4.

At decision box 1030 of FIG. 4, the program determines whether the $i^{th}$ character of the pattern matches the $i^{th}$ character of the address. If so, control is transferred to decision box 1040 of FIG. 4, otherwise, control is transferred to box 1080 of FIG. 4.

At decision box 1040 of FIG. 4, the program determines whether the length of the pattern equals i. If so, control is transferred to box 1050 of FIG. 4, otherwise, control is transferred to box 1060 of FIG. 4.

At box 1050 of FIG. 4, the program sets a flag indicating that a match was found and transfers control to box 1070 of FIG. 4 to return.

At box 1060 of FIG. 4, the program increments i by 1. Then, control is transferred to decision box 1020 of FIG. 4.

At box 1080 of FIG. 4, the program sets a flag indicating that a match was not found and transfers control to box 1070 of FIG. 4 to return.

The address database and the site database may be updated in accordance with methods which are well known to those of ordinary skill in the art to provide the information described above. Further, those skilled in the art recognize that further embodiments of the present invention may be made without departing from its teachings. For example, instead of utilizing an address database and a site database for each site in the network, the present invention may be embodied by fabricating one or more systems that act as a network address and site directory. In such an embodiment, knowledge about each network address and each site resides in the directory, and individual sites can query the directory for the above-described information. Still further, embodiments of the present invention are not restricted for use with store-and-forward messaging systems. In fact, they may be used, for example, in a computer network which uses, for example, alphanumeric strings, for addressing nodes.

In one embodiment of the present invention, each site in a network defines its own network address extension ranges. Further, as has been discussed above, these network address extension ranges are communicated to all other sites in the network when a new site is added to the network, when a new network address extension range is added to a site, or when an existing network address extension range is modified or deleted at a site. This is done, so that the address database discussed above contains information relating to all the network address extension ranges at all of the sites. As one can readily appreciate, there is a potential for having overlapping, non-unique network address extension ranges. This presents a problem in that the network will not be able to determine a correct remote site for delivering messages and may cause a message to be delivered to an unintended destination.

In practice, whenever a site wishes to become part of an existing network, or whenever an existing site wants to modify or delete an existing network address extension range, the site takes the following steps. If this is the addition of a new site to the network, the new site calls a site which is already part of the network to obtain a copy of the address database and the site database. It then adds its new information to the existing address and site databases while performing a validation process for all the existing network address extension ranges in the address database using a pattern matching algorithm. If this is an existing site, it modifies or deletes the network address extension ranges while performing a validation process for all the existing network address extension ranges in the address database using a pattern matching algorithm. Then, the site propagates the newly updated database to the other sites in the network. The validation process ensures that any conflicting network address extension range is noted as an error and it is automatically deleted from the address database.

The following describes the pattern matching algorithm for comparing two network address extension ranges to see if they overlap. First, if the length of the two network address extension ranges are different, then they do not overlap. Second, if the length of the two network address extension ranges are the same, then they are compared, character by character, to see if there is an overlap. For example, in the embodiment described above, X is a range character, i.e., it matches any character. Also it is assumed that once an X is encountered in a network address extension, when examining the range from left to right, that all subsequent characters to the right are X's. Thus, the algorithm compares the characters in the two network address extensions, one at a time, from left to right. The two ranges are different if a difference is encountered. Further, if no difference is encountered before an X character is encountered, then the ranges overlap. This can be understood in the context of the following example. Suppose the following network address extension ranges have been defined at a remote site: 98XXXX and 492XX, and further suppose that one wants to add the following network address extension ranges at a local site site: 986XXX and 492XXXX. As a result of utilizing the above-described algorithm, one will determine that 986XXX and 98XXXX overlap whereas 492XXXX and 492XX do not overlap.

Some embodiments of the present invention will not allow overlapping network address extension ranges. Other embodiments of the present invention will allow overlapping extension ranges, but not conflicting network address extension ranges. Conflicting network address extension ranges are those for which it is impossible to determine the site to which a network address belongs. In accordance with the present invention, only network address extension ranges which overlap and which also have the same number of "X" characters conflict. The determination of overlap, as discussed above, then implies that only identical network address extension ranges will conflict (where two otherwise identical network address extension ranges which differ only in the number of digits in the local address portion of the network address extension range are considered to be identical for this purpose, as a message from a site remote to both of these sites would be unable to determine the site to which to deliver a message). Note that for collocated sites, conflicts between the local address portions of the network address extension ranges must be prevented, as well as conflicts between the complete network address extension ranges.

What is claimed is:

1. Apparatus for use in a network of sites in transmitting a message from a message sender at a message sender site to a message recipient at a message recipient site, the message recipient site being collocated with or being remote with respect to the message sender site, which apparatus comprises:
    database means for storing information for the network which database means comprises:
        site database storing means for storing information for a site within the network, which information identifies whether the site is collocated or remote with respect to other sites in the network;
        address database storing means for storing information for a particular site within the network, which information comprises: (a) information which identifies groups of network addresses associated with the particular site, a group specific of said groups of network addresses being referred to as a network address extension range, and (b) information which identifies local extension addresses associated with each of the network addresses extension ranges, each of said local extension addresses being referred to as a local mailbox number; and
    user database storing means for storing information for each user in the network, which information comprises a specific network address and a specific local extension address associated with the user being referred to as a user's local mailbox number;
    sender, for receiving the specific network address of the message recipient, and for accessing the user database storing means to determine a message sender site identifier; and
    translation processor means for accessing the address database storing means and for comparing network address extension ranges for the network sites stored therein with the network address of the message recipient to determine if the network address of the message recipient is within a particular one of said network address extension ranges and to determine a message recipient site identifier, wherein the means for comparing further comprises means for accessing the site database storing means using a site identifier for a specific site to determine whether the specific site is collocated or remote with the message sender site and, if the message sender site and the specific site are collocated the means for comparing utilizes the local extension addresses associated with the particular network address extension range for comparing, else if remote the means for comparing utilizes the network address for comparing.

2. The apparatus of claim 1 wherein the translation processor means further comprises means for accessing the database means using the message sender site identifier and the network address of the message recipient as a retrieval key for retrieving a specific local mailbox number of the message recipient.

3. The apparatus of claim 1 wherein the address database storing means further stores information which provides range indication information associated with the network address extension ranges and wherein the translation processor means further comprises means for comparing the range indication information associated the with network address extension ranges which include the network address of the message recipient and for selecting one of said network address extension ranges having a predetermined amount of range indication information.

4. The apparatus of claim 3 wherein a network address extension range is comprised of range indication characters and the range indication information comprises a number of range indication characters which comprise the network address extension range and wherein the means for comparing range indication information and for selecting a network address extension range comprises means for selecting one of said network address extension ranges comprised of fewer of said range indication characters.

5. The apparatus of claim 2 wherein the translation processor means further comprises means for accessing the user database storing means using the local mailbox number as a key for determining whether the message recipient has use of a local mailbox associated with the local mailbox number.

6. The apparatus of claim 1 wherein the user database storing means comprises means for storing information comprising the network address and the local mailbox number associated with sites and wherein the translation processor means further comprises means for accessing the user database storing means using the network address of the message recipient as a retrieval key for determining whether the message recipient is associated with the message sender's site.

7. The apparatus of claim 2 wherein the translation processor means comprises means for accessing the address database storing means using the network address of the message recipient as a key for comparing with the groups of network addresses associated with the recipient's site.

8. Method for use in a network of sites in transmitting a message from a message sender at a message sender site to a message recipient at a message recipient site, the message recipient site being collocated with or being remote with respect to the message sender site, which method comprises the steps of:

storing the following information for the network in a database which comprises the steps of:

storing site information in the database for a site within the network, which information identifies whether the site is collocated or remote with respect to other sites in the network;

storing address information in the database for a particular site within the network, which information comprises: (a) information which identifies groups of network addresses, associated with the particular site, a specific group of said groups of network addresses being referred to as a network address extension range, and (b) information which identifies local extension addresses associated with each of the network addresses extension ranges, each of said local extension addresses being referred to as a local mailbox number; and storing user information which identifies, for each user in the network, which information comprises a specific network address and a specific local extension address associated with the user being referred to as a user's local mailbox number; and in response to an interaction with the message sender, receiving the specific network address of the message recipient, and accessing the stored user information for determining a message sender site identifier; and accessing the stored address information and comparing network address extension ranges for the network sites stored therein with the network address of the message recipient for determining if the network address of the message recipient is within a particular one of said network address extension ranges and for determining a message recipient site identifier, wherein the comparing further comprises accessing the stored site information using a site identifier for a specific site for determining whether the specific site is collocated or remote with the message sender site and, if the message sender site and the specific site are collocated the step of comparing utilizes the local extension addresses associated with the particular network address extension range for comparing else if remote the step of comparing utilizes the network address for comparing.

* * * * *